(12) United States Patent
Inomata

(10) Patent No.: US 6,690,302 B1
(45) Date of Patent: Feb. 10, 2004

(54) VEHICLE EMERGENCY REPORTING DEVICE

(75) Inventor: Jin Inomata, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 40 days.

(21) Appl. No.: 10/030,229
(22) PCT Filed: Jul. 26, 2000
(86) PCT No.: PCT/JP00/04990
§ 371 (c)(1),
(2), (4) Date: Jan. 8, 2002
(87) PCT Pub. No.: WO02/08021
PCT Pub. Date: Jan. 31, 2002

(51) Int. Cl.$^7$ ............................................. G08G 1/123
(52) U.S. Cl. ..................... 340/989; 340/426.2; 340/993
(58) Field of Search ................................ 340/989, 988, 340/993, 426.19, 426.2, 426.28, 5.72; 701/2, 207

(56) References Cited

U.S. PATENT DOCUMENTS 5,311,197 A * 5/1994 Sorden et al. ............... 342/457
5,933,080 A * 8/1999 Nojima .................. 340/539.11
5,969,598 A * 10/1999 Kimura ....................... 340/436
6,161,005 A * 12/2000 Pinzon ........................ 455/403
6,262,655 B1 * 7/2001 Yoshioka et al. ......... 340/425.5
6,337,641 B1 * 1/2002 Yoshioka et al. ........... 340/989
6,404,352 B1 * 6/2002 Ichikawa et al. ........... 340/988

FOREIGN PATENT DOCUMENTS

JP      2000-49975      2/2000

* cited by examiner

Primary Examiner—Toan Pham
(74) Attorney, Agent, or Firm—Sughrue Mion, PLLC

(57) ABSTRACT

An emergency reporting apparatus for a vehicle that reports an accident to a predetermined receiving center, where the apparatus necessarily exists in the vehicle when an accident happens, makes it possible to report an emergency without requiring the passenger to perform a troublesome operation such as the connection to a predetermined part when he/she gets into the vehicle, and allows medical support to be provided without delay by specifying each occupant. The apparatus includes a vehicle-mounted terminal that detects when an accident happened to the vehicle and performs short distance communication in a non-contact manner to send information concerning the accident, and a portable terminal, that is a mobile telephone, includes a keyless entry control for unlocking or locking a door of the vehicle and performs short distance communication with the vehicle-mounted terminal in the non-contact manner, and transmits the accident information to a report receiving center.

13 Claims, 11 Drawing Sheets

VEHICLE EMERGENCY REPORTING DEVICE

FIELD OF THE INVENTION

The present invention relates to an emergency reporting apparatus for a vehicle that reports an accident or the like happened to the vehicle to a predetermined emergency report receiving center.

BACKGROUND OF THE INVENTION

Conventional emergency reporting apparatuses for vehicles report accidents or the like happened to the vehicles to emergency report receiving centers using emergency report transmitting means, such as car phones, preinstalled in the vehicles or using transportable emergency report transmitting means, such as mobile telephones, connected to the vehicles.

FIG. 11 shows a system construction of a conventional emergency reporting apparatus for a vehicle that is, for instance, the same as that disclosed in JP-A-2000-49975.

In FIG. 11, reference numeral 1 denotes an emergency reporting terminal mounted on a vehicle, numeral 2 an emergency report transmitting means, numeral 3 an antenna, and numeral 4 a vehicle starting device, with the emergency reporting terminal 1 being provided with an emergency report issuing button 5, a control unit 6, a gyro sensor 7, a positional information obtaining and processing unit 8, a storage unit 9, a GPS antenna 10, and a GPS receiver 11.

When a user brings a mobile telephone or the like into a vehicle although another emergency report transmitting means is preinstalled in the vehicle, this results in an uneconomical situation where the user possesses a plurality of emergency report transmitting means.

Further, when a mobile telephone or the like needs to be connected to a vehicle as a transportable emergency report transmitting means, there may be a case where a user does not carry the emergency report transmitting means and therefore an emergency report cannot be transmitted when an accident actually happens. Further, in the case of a transportable emergency report transmitting means, a user is bothered by the necessity to connect a mobile telephone or the like to a predetermined part of a vehicle each time he/she gets into the vehicle.

Further, because it is not specified who rides in a vehicle, medical information about the occupant is not necessarily correctly and swiftly conveyed when an accident happens. This causes a hindrance to urgent medical support.

The present invention has been made in view of the above-mentioned problems, and an object of the present invention is to provide an emergency reporting apparatus for a vehicle that, when an accident happens to the vehicle, reports the accident to a predetermined receiving center. The emergency reporting apparatus of the present invention necessarily exists in the vehicle when a passenger rides in the vehicle and when an accident happens. The emergency reporting apparatus of the present invention also makes it possible to transmit an emergency report without requiring the passenger to perform a troublesome operation such as the connection to a predetermined part when he/she gets into the vehicle.

An object of the present invention is also to provide an emergency reporting apparatus for a vehicle that allows medical support to be provided without delay by specifying each occupant.

DISCLOSURE OF THE INVENTION

In order to achieve the above object, according to the present invention, there is provided an emergency reporting apparatus for a vehicle comprising: a vehicle-mounted terminal that is mounted on the vehicle, includes an accident detecting means for detecting an accident happened to the vehicle and a communicating means for sending information concerning the accident when the accident detecting means detects the accident, and sends the accident information; and a portable terminal that is a mobile telephone, includes a door open/close control means for unlocking or locking a door of the vehicle and a communicating means for communicating with the communicating means of the vehicle-mounted terminal, and transmits the accident information sent from the vehicle-mounted terminal to a preset transmission destination.

Also, the door open/close control means of the portable terminal includes a communicating means and unlocks or locks the vehicle door by operating a door unlocking/locking means mounted on the vehicle.

Further, the door open/close control means of the portable terminal sends a door unlocking signal or a door locking signal to the vehicle-mounted terminal via the communicating means provided in the portable terminal in order to unlock or lock the vehicle door by operating a door unlocking/locking means mounted on the vehicle via the vehicle-mounted terminal.

Furthermore, the portable terminal includes a position detecting means and transmits the accident information, to which positional information has been added by the transmitting means, to the preset transmission destination.

Still further, when detecting a shortage of remaining charge in a battery, the portable terminal informs the vehicle-mounted terminal of the shortage of the remaining charge in the battery using the communicating means, and the vehicle-mounted terminal notifies a user of the shortage of the remaining charge in the battery using an information notifying means mounted on the vehicle.

Yet still further, the vehicle-mounted terminal communicates with the portable terminal using the communicating means at predetermined time intervals and, when the communication becomes impossible, notifies a user that it becomes impossible to transmit an emergency report, the notification being made using an information notifying means mounted on the vehicle.

Further, the portable terminal includes a door unlocking button for unlocking the vehicle door and a door locking button for locking the vehicle door.

Furthermore, the portable terminal includes a door unlocking/locking button for unlocking and locking the vehicle door.

Still further, the portable terminal includes a door unlocking and conversation starting off hook button for unlocking the vehicle door and starting a telephone conversation and a door locking and conversation ending on hook button for locking the vehicle door and ending the telephone conversation.

Yet still further, the portable terminal includes an information notifying means, the vehicle-mounted terminal informs the portable terminal whether the door is in an unlocked state or a locked state using the communicating means, and the portable terminal notifies a user of whether the door is in an unlocked state or a locked state using the information notifying means.

Furthermore, the vehicle-mounted terminal prestores identification information identifying a person and controls one of unlocking and locking of the door, ignition of an engine, and start of the vehicle by comparing the identification information with information sent from the portable terminal via the communicating means.

In addition, the portable terminal includes a person identifying means for identifying a person and, when an accident happens, transmits identification information concerning the person to the transmission destination.

Finally, the vehicle-mounted terminal stores personal identification information that concerns each occupant other than a driver and is inputted when the occupant gets into the vehicle and, when an accident happens, transmits a number of people riding in the vehicle and the personal identification information concerning each occupant to the transmission destination via the portable terminal.

BEST MODE FOR CARRYING OUT THE INVENTION

With the present invention, a keyless entry function is given to a portable terminal, such as a mobile telephone, used to report an emergency, thereby forcing a user to bring the portable terminal into a vehicle when he/she gets into the vehicle.

Further, a vehicle-mounted terminal mounted on the vehicle is provided with an accident detecting means achieved by a shock sensor, a manual button, and the like. When the accident detecting means detects that an accident happened to the vehicle, the accident is reported to a predetermined emergency report receiving center via the portable terminal using non-contact communication means that performs radio wave communication, optical communication, or the like.

Further, to identify a person attempting to unlock a door using a keyless entry function, a person identifying means is used which checks the fingerprint, voiceprint, or the like of the person. When an accident happens, personal identification information obtained by the person identifying means is conveyed to the receiving center. At the receiving center, medical support is provided speedily using medical data that is prestored as a database and gives the blood type, chronic disease, or the like of the person.

Embodiments of the present invention are described below.

FIRST EMBODIMENT

Figure 1:
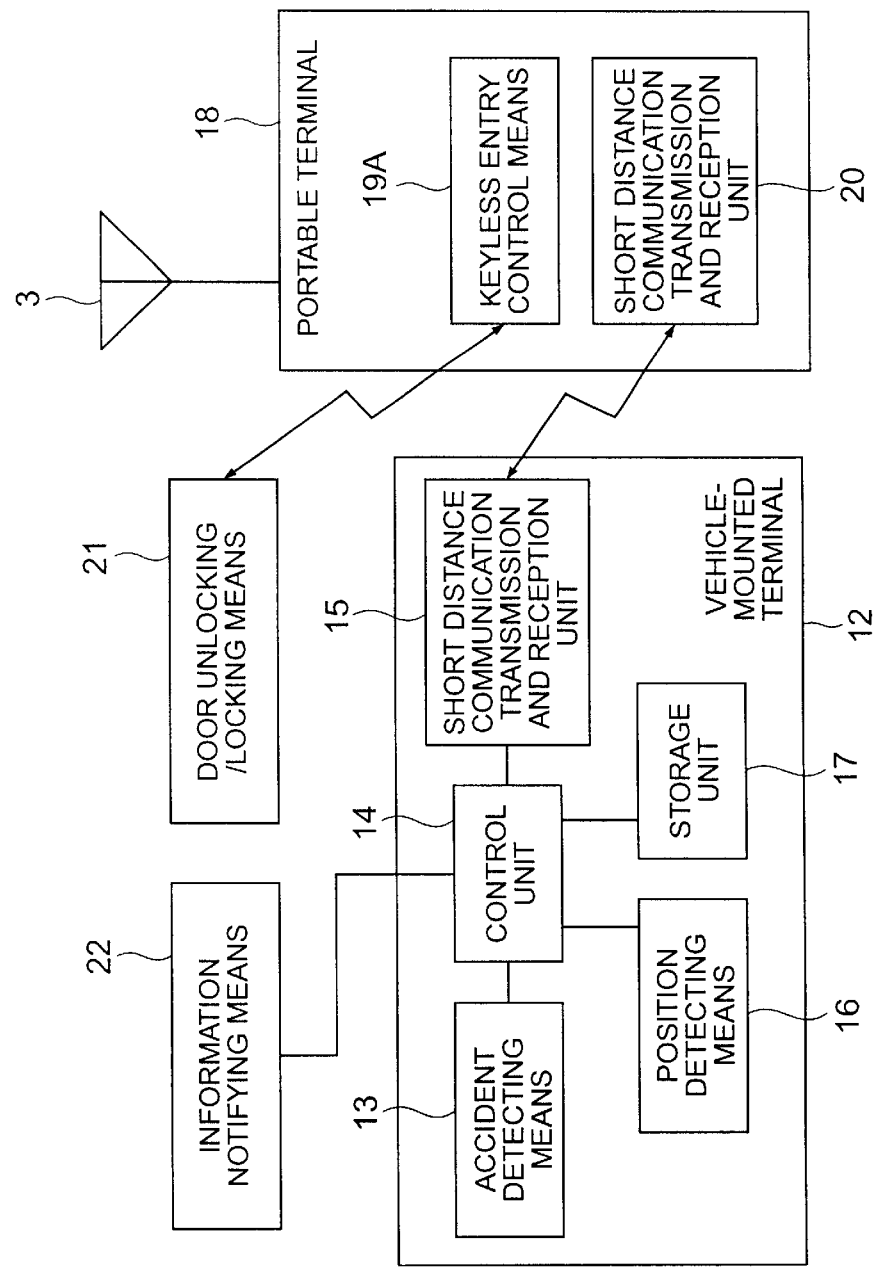
FIG. 1 is a block diagram showing a construction of an emergency reporting apparatus for a vehicle according to a first, fourth, and fifth embodiments of the present invention.

FIG. 1 is a block diagram showing a construction of an emergency reporting apparatus for a vehicle according to the first embodiment of the present invention.

Referring to FIG. 1, a vehicle-mounted terminal 12 is a terminal mounted on the vehicle and includes an accident detecting means 13, a control unit 14, a short distance communication transmission and reception unit 15, a position detecting means 16, and a storage unit 17.

The accident detecting means 13 is achieved using an acceleration sensor for detecting a shock, a rollover sensor for detecting a rollover of the vehicle based on detection results in the gravity direction, an interface for detecting the expansion of an airbag by receiving a signal from an airbag controller, an emergency report button with which a user manually inputs the occurrence of an accident or the like.

The position detecting means 16 is realized by a GPS (Global Positioning System), a self-contained navigation system, or the like.

Meanwhile, the portable terminal 18 shown in FIG. 1 is a mobile telephone and functions as an emergency report transmitting means. This portable terminal 18 is always carried by a user who rides in the vehicle and transmits an emergency report to a preset emergency report receiving center existing outside of the vehicle when an accident happens. Also, the portable terminal 18 includes a keyless entry control means 19A having a communicating means, and a short distance communication transmission and reception unit 20.

This portable terminal 18 unlocks or locks a door of the vehicle using a keyless entry function achieved by the keyless entry control means 19A. That is, the portable terminal 18 operates a vehicle door unlocking/locking means 21 mounted on the vehicle through communication. Further, the short distance communication transmission and reception unit 20 of the portable terminal 18 performs non-contact short distance communication utilizing a radio wave, light, or the like with the short distance communication transmission and reception unit 15 of the vehicle-mounted terminal 12. Further, the portable terminal 18 transmits an emergency report to the emergency report receiving center existing outside via a communication antenna 3 using its mobile telephone function.

An information notifying means 22 is further mounted on the vehicle. This information notifying means 22 is achieved by being provided with a speaker, a display, an LED, a lamp, a vibrator, or the like, and notifies the user of information under the control by the control unit 14 of the vehicle-mounted terminal 12.

Next, the operation of the emergency reporting apparatus for a vehicle having the construction shown in FIG. 1 is described.

The user unlocks the door of the vehicle using the keyless entry control means 19A provided in the portable terminal 18, and gets into the vehicle.

When the accident detecting means 13 detects that an accident happened to the vehicle, the control unit 14 of the vehicle-mounted terminal 12 sends data showing an accident situation or the like generated by the accident detecting means 13 and positional information generated by the position detecting means 16 to the short distance communication transmission and reception unit 20 of the portable terminal 18 using the short distance communication transmission and reception unit 15 that performs non-contact communication utilizing a radio wave, light, or the like.

The portable terminal 18 receives the data sent from the vehicle-mounted terminal 12 and transmits the received data to the emergency report receiving center via the communication antenna 3 using the mobile telephone function. In this manner, an emergency report is transmitted.

Accordingly, in this first embodiment, when getting into the vehicle, the driver necessarily brings the portable terminal 18 into the vehicle. This is because when getting into the vehicle, the driver uses the keyless entry control means 19A provided in the portable terminal 18 to unlock the vehicle door. When an accident happens to the vehicle, an emergency report is automatically transmitted to the predetermined receiving center using the short distance communication transmission and reception unit 20 and the mobile telephone function of the portable terminal 18 carried by the user. Further, the portable terminal 18 necessarily exists in the vehicle when the user rides in the vehicle and when an accident happens to the vehicle. Further, an emergency report is transmitted without requiring the user to perform such a cumbersome operation that he/she connects and fixes the portable terminal 18 to a predetermined part.

SECOND EMBODIMENT

Figure 2:
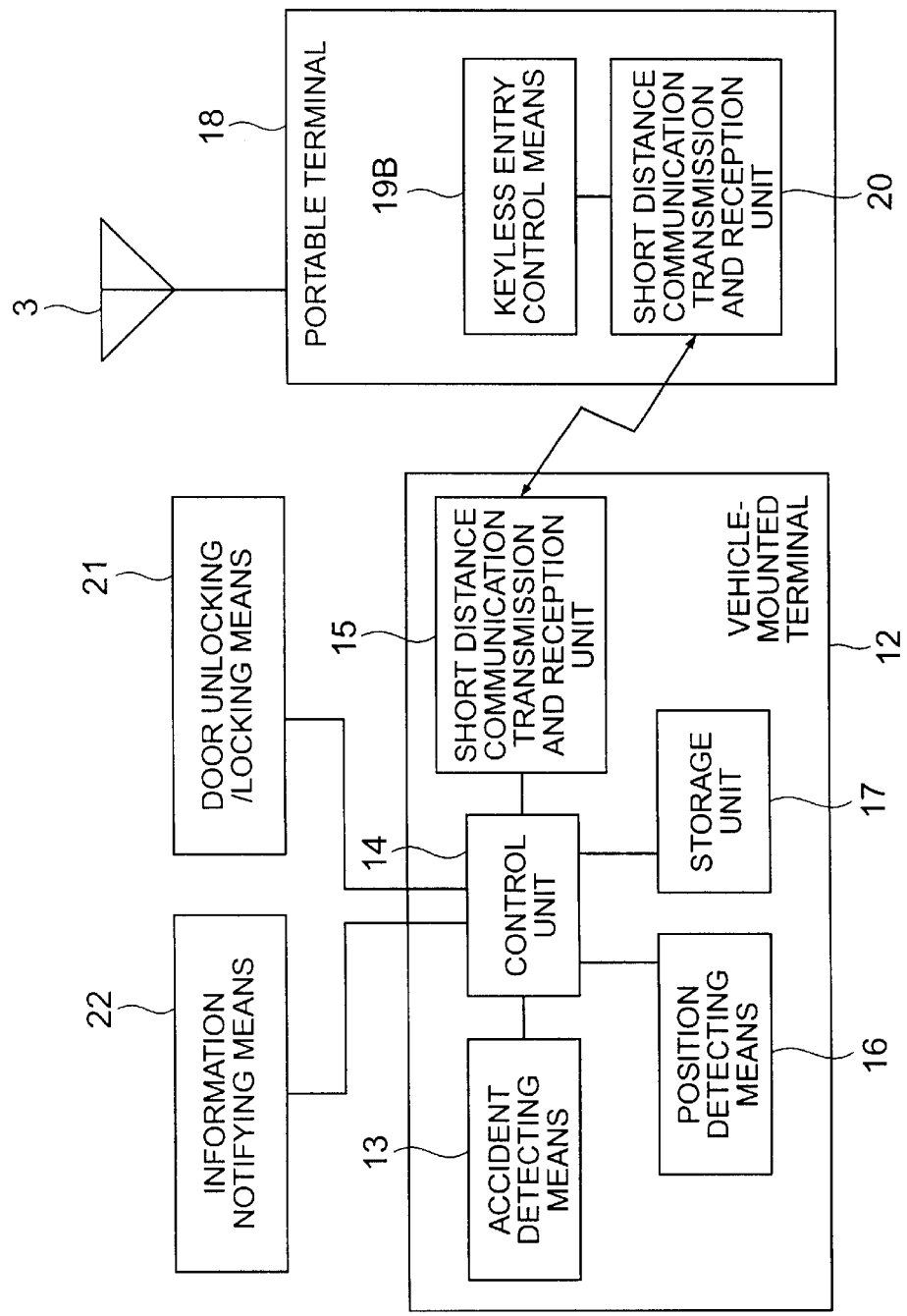
FIG. 2 is a block diagram showing the construction of an emergency reporting apparatus for a vehicle according to a second and tenth embodiments of the present invention.

FIG. 2 is a block diagram showing the construction of an emergency reporting apparatus for a vehicle according to the second embodiment of the present invention.

In FIG. 2, reference symbol 19B denotes a keyless entry control means provided in the portable terminal 18. This keyless entry control means 19B does not have the communicating means used in the first embodiment. Therefore, in this embodiment, the keyless entry control means 19B sends a door unlocking signal or a door locking signal to the vehicle-mounted terminal 12 via the short distance communication transmission and reception units 20 and 15 used to send data concerning an emergency report. In this manner, the keyless entry control means 19B operates the door unlocking/locking means 21 mounted on the vehicle via the vehicle-mounted terminal 12 to unlock or lock a door of the vehicle. Other constructions in this drawing are the same as those in FIG. 1.

Next, the operation of the emergency reporting apparatus according to the second embodiment having the construction shown in FIG. 2 is described.

In this second embodiment, the short distance communication transmission and reception units 20 and 15, which are used to send emergency report data in the first embodiment, also function as the communicating means of the first embodiment that is used to perform a keyless entry operation.

When a user performs a door unlocking operation by operating the portable terminal 18, the keyless entry control means 19B transmits a door unlocking signal to the vehicle-mounted terminal 12 via the short distance communication transmission and reception unit 20. On receiving the door unlocking signal from the short distance communication transmission and reception unit 15, the control unit 14 of the vehicle-mounted terminal 12 conveys the information to the door unlocking/locking means 21, which then unlocks the door. When locking the door, a similar operation is performed.

Accordingly, it is possible to lock and unlock the vehicle door by transmitting the door locking signal and door unlocking signal to the vehicle-mounted terminal 18 using the keyless entry control unit 19B provided in the portable terminal 18.

THIRD EMBODIMENT

Figure 3:
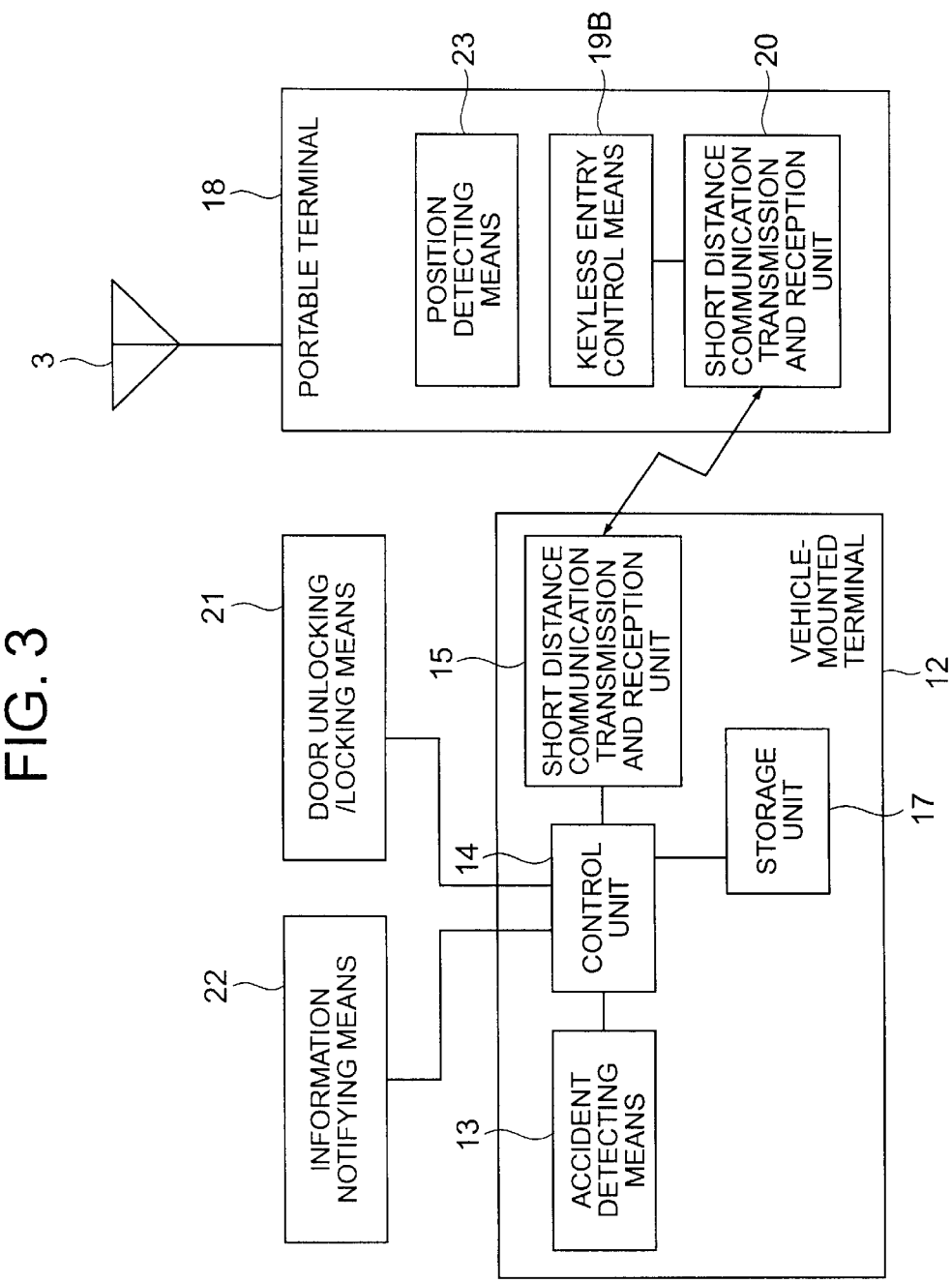
FIG. 3 is a block diagram showing the construction of an emergency reporting apparatus for a vehicle according to a third embodiment of the present invention.

FIG. 3 is a block diagram showing the construction of an emergency reporting apparatus for a vehicle according to the third embodiment of the present invention.

In FIG. 3, the same construction elements as in the second embodiment shown in FIG. 2 are assigned the same reference numerals and are not described here. New reference numeral 23 denotes a position detecting means provided in the portable terminal 18. In this third embodiment, the portable terminal 18 obtains positional information from the position detecting means 23, adds the positional information to accident information sent from the vehicle-mounted terminal 12, and transmits these information to an emergency report receiving center.

That is, like in the first and second embodiments, the accident detecting means 13 and the short distance communicating means including the short distance communication transmission and reception units 15 and 20 are used in this third embodiment. However, the position detecting means 23 is provided in the portable terminal 18 that is a mobile telephone or the like. That is, in this embodiment, as for positional information, data obtained in the portable terminal 18 is transmitted to an emergency report receiving center. Note that in this case, it becomes unnecessary for the vehicle-mounted terminal 12 to include a position detecting means.

Accordingly, in the third embodiment, positional information is automatically transmitted along with accident information to a predetermined receiving center when an accident happens.

FOURTH EMBODIMENT

The fourth embodiment is described below. In this embodiment, when a shortage of the remaining charge in a battery used for the portable terminal 18 is detected, the user is informed of this remaining charge shortage.

For instance, in the block diagram shown in FIG. 1, the portable terminal 18 is changed as follows. When a shortage of the remaining charge in the battery is detected, the portable terminal 18 informs the vehicle-mounted terminal 12 of the remaining charge shortage via the short distance communication transmission and reception unit 20. Under the control by the control unit 14 of the vehicle-mounted terminal 12, the information notifying means 22 notifies the user of the remaining charge shortage. Here, the information notifying means 22 is achieved by being provided with a speaker, a display, an LED, a lamp, a vibrator, or the like. For instance, the information notifying means 22 notifies the user of the remaining charge shortage by appealing to the sense of hearing with a sound or voice, the sense of sight with a display, or the sense of touch with a vibration.

Accordingly, in the fourth embodiment, when only a small charge remains in the battery used for the portable terminal 18 and the possibility that the portable terminal 18 becomes unusable is increased, a notification is issued to the occupant. This prevents a situation where an emergency report cannot be transmitted when an accident happens.

FIFTH EMBODIMENT

The fifth embodiment is described below. In this embodiment, the vehicle-mounted terminal 12 detects a situation where reporting of an emergency becomes impossible, and informs the user of this situation.

For instance, in the block diagram shown in FIG. 1, the vehicle-mounted terminal 12 is used so as to communicate with the portable terminal 18 using the short distance communication transmission and reception units 15 and 20 at predetermined time intervals. When the communication becomes impossible, that is, when the communication with the portable terminal 18 at the predetermined time intervals becomes impossible, the information notifying means 22 notifies the user of this situation under the control by the control unit 14 of the vehicle-mounted terminal 12. Here, the information notifying means 22 is achieved by being provided with a speaker, a display, an LED, a lamp, a vibrator, or the like. For instance, the information notifying means 22 notifies the user that reporting of an emergency becomes impossible by appealing to the sense of hearing with a sound or voice, the sense of sight with a display, or the sense of touch with a vibration.

Accordingly, in the fifth embodiment, a situation where reporting of an emergency becomes impossible is prevented.

SIXTH EMBODIMENT

Figure 4:
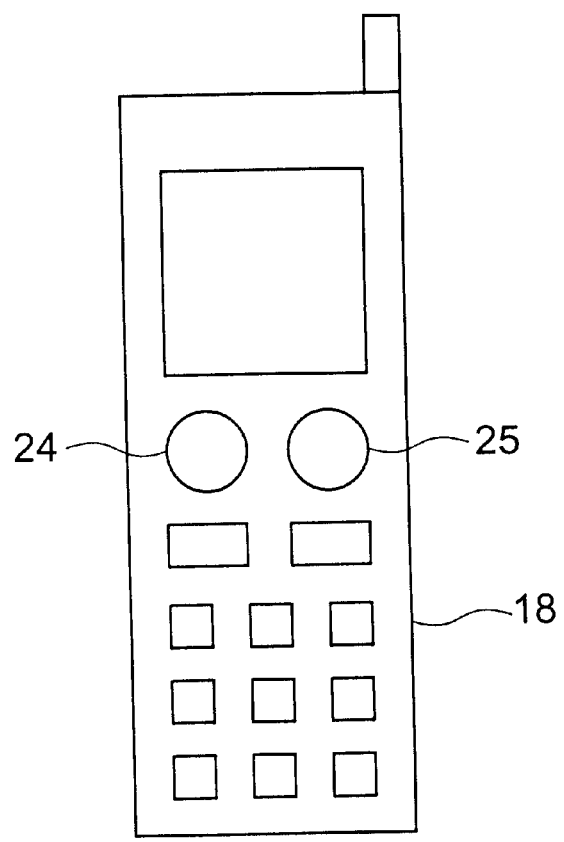
FIG. 4 shows a schematic appearance of a portable terminal 18 according to a sixth embodiment of the present invention.

FIG. 4 shows the schematic appearance of the portable terminal 18 according to the sixth embodiment of the present invention.

As shown in FIG. 4, a door unlocking button 24 for unlocking the vehicle door and a door locking button 25 for locking the vehicle door are provided on a surface of the body of the portable terminal 18.

The portable terminal 18 unlocks the vehicle door using the keyless entry function when a user depresses the door unlocking button 24, while the portable terminal 18 locks the vehicle door using the keyless entry function when the user depresses the door locking button 25.

Accordingly, in the sixth embodiment, the door unlocking button 24 and the door locking button 25 are provided on the portable terminal 18. This realizes an emergency reporting apparatus for a vehicle where the user easily understands a keyless entry operation.

SEVENTH EMBODIMENT

Figure 5:
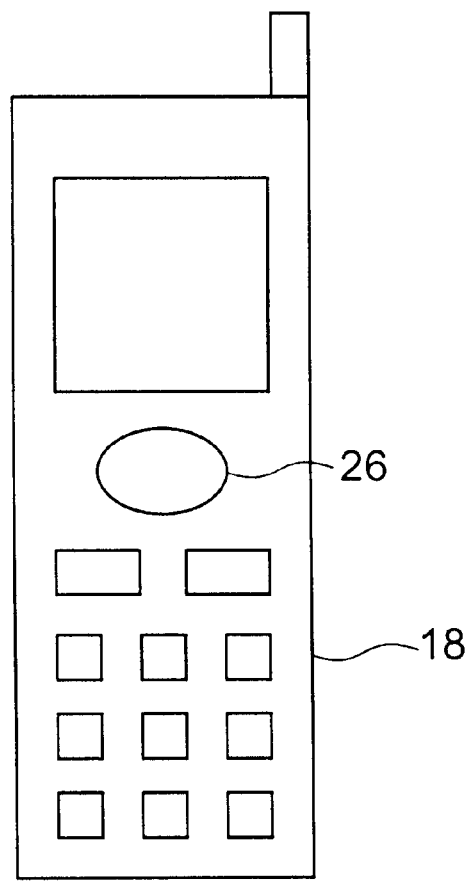
FIG. 5 shows the schematic appearance of the portable terminal 18 according to a seventh embodiment of the present invention.

FIG. 5 shows the schematic appearance of the portable terminal 18 according to the seventh embodiment of the present invention.

As shown in FIG. 5, a door unlocking/locking button 26 for unlocking and locking the vehicle door is provided on a surface of the body of the portable terminal 18. Each time this door unlocking/locking button 26 is depressed, the unlocking or locking of the vehicle door is performed.

When a user depresses the door unlocking/locking button 26 under a situation where the door is locked, the portable terminal 18 unlocks the vehicle door using the keyless entry function. On the other hand, when the user depresses the door unlocking/locking button 26 under a situation where the door is unlocked, the portable terminal 18 locks the vehicle door using the keyless entry function.

Accordingly, in the seventh embodiment, the door unlocking/locking button 26 is provided on the portable terminal 18. This realizes an emergency reporting apparatus for a vehicle where the user easily understands a keyless entry operation.

EIGHTH EMBODIMENT

Figure 6:
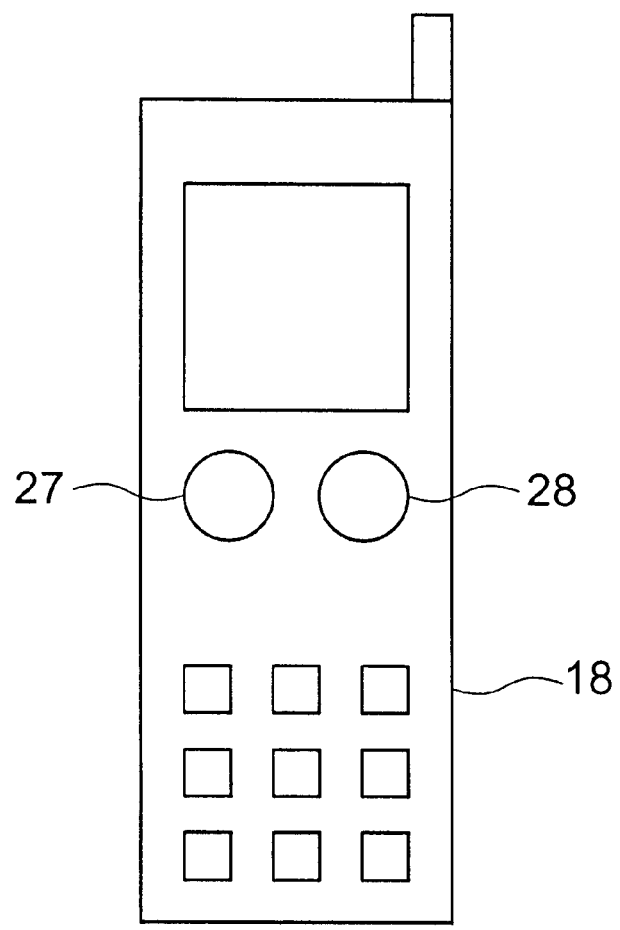
FIG. 6 shows the schematic appearance of the portable terminal 18 according to an eighth embodiment of the present invention.

FIG. 6 shows the schematic appearance of the portable terminal 18 according to the eighth embodiment of the present invention.

As shown in FIG. 6, a door unlocking and conversation starting off hook button 27 and a door locking and conversation ending on hook button 28 are provided on a surface of the body of the portable terminal 18.

Figure 7:
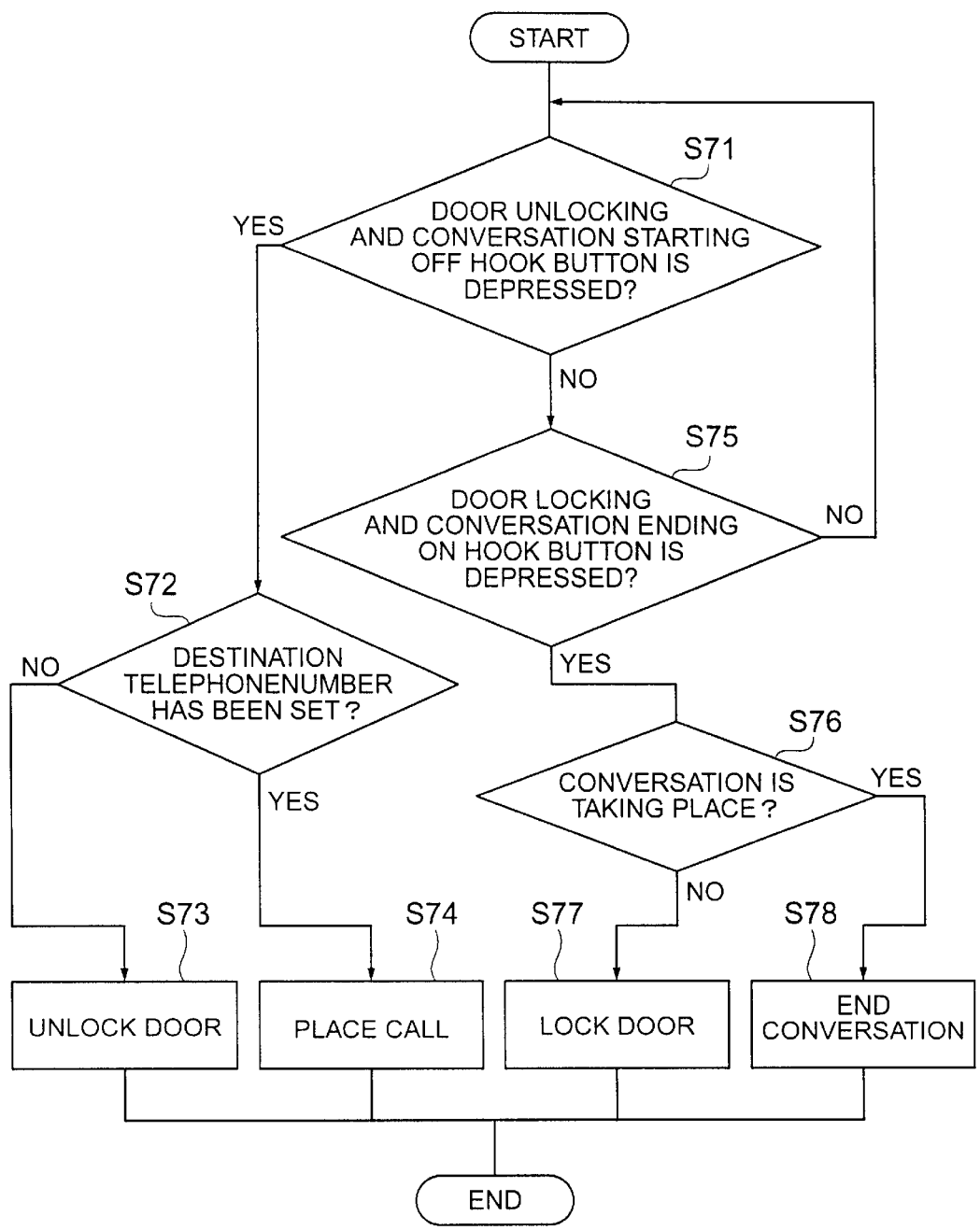
FIG. 7 is a flowchart showing a control operation according to the eighth embodiment of the present invention.

FIG. 7 is a flowchart showing the operation of the portable terminal 18 according to this eighth embodiment. The eighth embodiment is described below with reference to FIGS. 6 and 7.

First, when no destination telephone number is set at a time when the user depresses the door unlocking and conversation starting off hook button 27, the portable terminal 18 unlocks the vehicle door using a keyless entry function (steps S71, S72, and S73). On the other hand, when a destination telephone number is set at a time when the user depresses the door unlocking and conversation starting off hook button 27, the portable terminal 18 places a call to the set destination (steps S71, S72, and S74).

Next, when conversation is not taking place at a time when the user depresses the door locking and conversation ending on hook button 28, the portable terminal 18 locks the vehicle door using the keyless entry function (steps S75, S76, and S77). On the other hand, when conversation is taking place at a time when the user depresses the door locking and conversation ending on hook button 28, the portable terminal 18 ends the conversation (steps S75, S76, and S78).

Accordingly, in the eighth embodiment, the door unlocking and conversation starting off hook button 27 and the door locking and conversation ending on hook button 28 are provided on the portable terminal 18. This makes it possible to use an appearance, die, and the like of a conventional terminal, such as a mobile telephone, as they are. As a result, it is possible to manufacture the portable terminal 18 of the present embodiment at low cost. Further, a button used to start conversation make off hook doubles as a button for unlocking the vehicle door using the keyless entry function, and a button used to end conversation make on hook doubles as a button for locking the vehicle door using the keyless entry function. This realizes an emergency reporting apparatus for a vehicle where the user easily understands how to use the portable terminal 18.

NINTH EMBODIMENT

Figure 8:
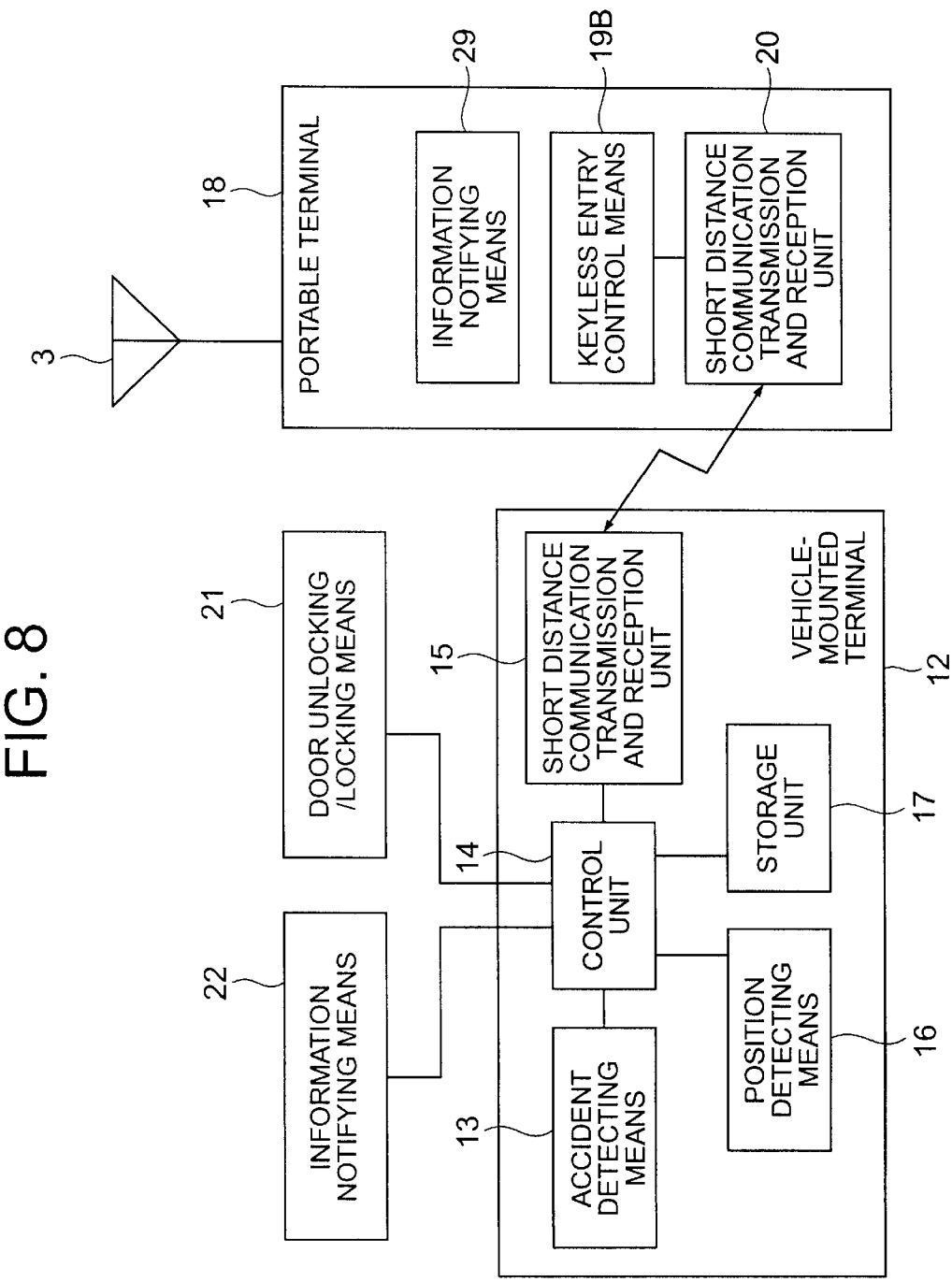
FIG. 8 is a block diagram showing the construction of the portable terminal 18 according to a ninth embodiment of the present invention.

FIG. 8 is a block diagram showing the construction of an emergency reporting apparatus for a vehicle according to the ninth embodiment of the present invention.

In FIG. 8, the same construction elements as in the second embodiment shown in FIG. 2 are assigned the same reference numerals and are not described here. New reference numeral 29 denotes an information notifying means that is provided in the portable terminal 18 and includes a speaker, a display, an LED, a lamp, a vibrator, or the like. This information notifying means 29 receives information showing whether a door is in an unlocked state or in a locked state from the vehicle-mounted terminal 12 via the short distance communication transmission and reception units 15 and 20, and notifies a user of the door state.

The operation of the emergency reporting apparatus according to the ninth embodiment is described below with reference to FIG. 8.

When the user performs a door unlocking operation or a door locking operation by operating the portable terminal 18, the short distance communication transmission and reception unit 20 transmits a door unlocking signal or a door locking signal to the vehicle-mounted terminal 12 under the control by the keyless entry control means 19B. On receiving the door unlocking signal or the door locking signal via the short distance communication transmission and reception unit 15, the vehicle-mounted terminal 12 conveys the information to the door unlocking/locking means 21, which then unlocks or locks the door and informs the control unit 14 that the door is placed in the unlocked state or the locked state. The control unit 14 informs the portable terminal 18 that the door is placed in the unlocked state or the locked state via the short distance communication transmission and reception unit 15. The portable terminal 18 notifies the user of the current state of the door using the information notifying means 29.

Accordingly, in the ninth embodiment, since the information notifying means 29 is provided in the portable terminal 18, this construction allows the user to recognize whether the door is in the unlocked state or in the locked state with precision.

TENTH EMBODIMENT

In this tenth embodiment, in the construction shown in FIG. 2 according to the second embodiment, identification information identifying a person is prestored in the storage unit 17 of the vehicle-mounted terminal 12. The control unit 14 compares this identification information with information transmitted from the portable terminal 18 via the short distance communication means 20 and 15. According to the comparison result, the control unit 14 controls the unlocking and locking of a door, the ignition of an engine, or the start of a vehicle.

That is, in the construction shown in FIG. 2, the storage unit 17 prestores a telephone number assigned to a mobile telephone, a telephone number assigned to a subscriber identification module (hereinafter referred to as the "SIM") placed in the mobile telephone, a personal identification number specified by the combination of order of pushed buttons of the mobile telephone, a personal identification number used by a personal identification number registering function that is a function of the mobile telephone, a personal identification number used by a personal identification number registering function that is a function of the SIM placed in the mobile telephone, or identification data identifying a person that is obtained by a means for identifying the person by checking a fingerprint, voiceprint, or the like of the person.

Then, when a user attempts to unlock the door, the portable terminal 18 transmits information to the vehicle-mounted terminal 12, which then compares the transmitted information with the information prestored in the storage unit 17. According to the comparison result, the vehicle-mounted terminal 12 allows or prohibits the unlocking of the door, the operation of an engine staring apparatus, or the operation of a vehicle starting apparatus.

Accordingly, in the tenth embodiment, identification information identifying a person is prestored in the storage area 17 of the vehicle-mounted terminal 12. The identification information is compared with information transmitted from the portable terminal 18 via the short distance communication means 20 and 15. The unlocking and locking of a door, the ignition of an engine, or the start of a vehicle is controlled according to the comparison result. Therefore, this realizes an emergency reporting apparatus for a vehicle that uses a keyless entry function having a high level of security.

ELEVENTH EMBODIMENT

Figure 9:
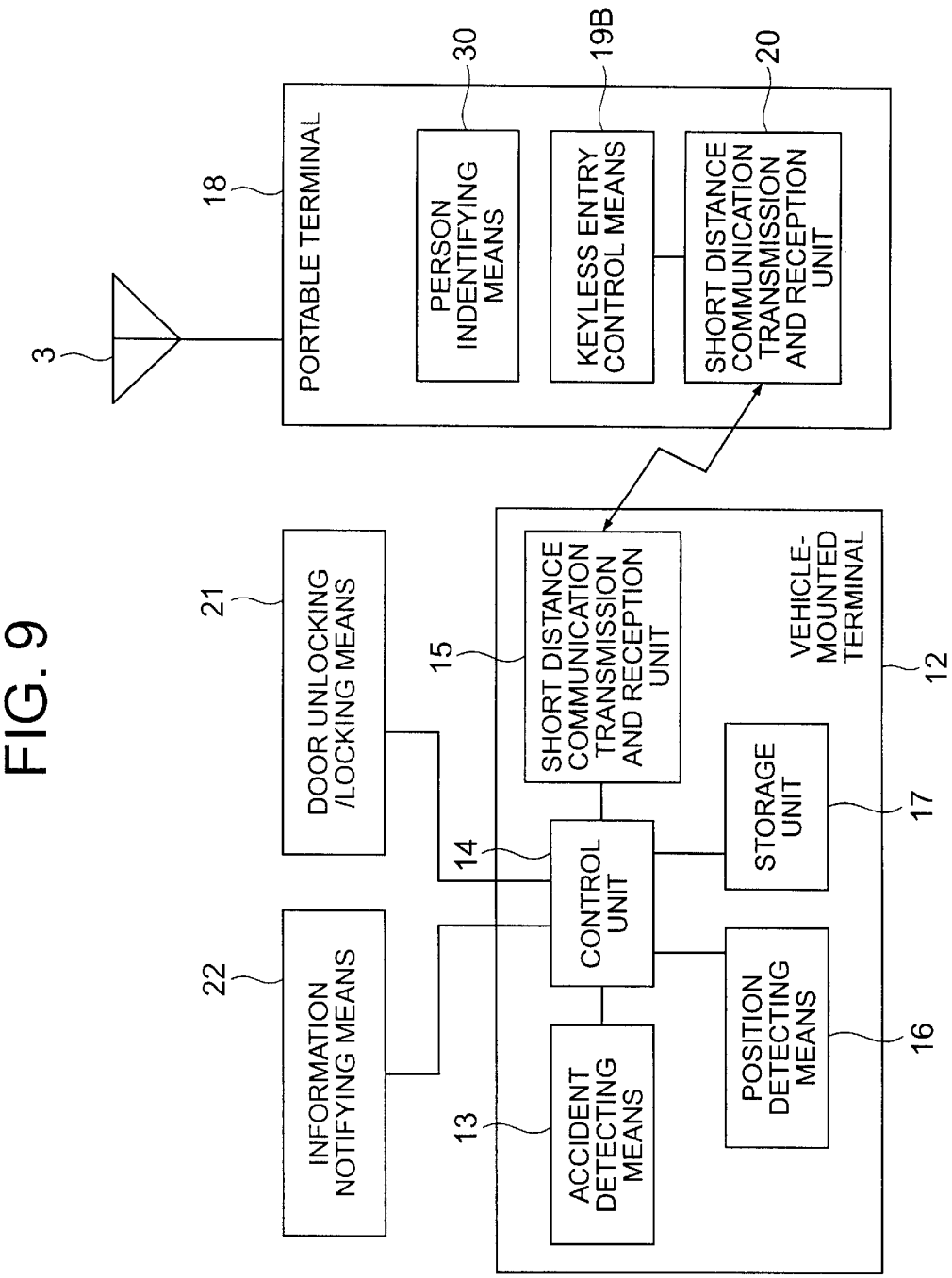
FIG. 9 is a block diagram showing the construction of an emergency reporting apparatus for a vehicle according to an eleventh and twelfth embodiments of the present invention.

FIG. 9 is a block diagram showing the construction of an emergency reporting apparatus for a vehicle according to the eleventh embodiment of the present invention.

In FIG. 9, the same construction elements as in the second embodiment shown in FIG. 2 are assigned the same reference numerals and are not described here. New reference numeral 30 denotes a person identifying means provided in the portable terminal 18. This person identifying means is achieved by a fingerprint recognizing means using a CCD image pickup device or the like, a voiceprint recognizing means using a microphone or the like, or another means. When an accident happens, the portable terminal 18 conveys personal identification information obtained by the person identifying means 30 to an emergency report receiving center.

Next, the operation of the emergency reporting apparatus according to this eleventh embodiment is described.

When a user attempts to unlock the vehicle door, the person identifying means 30 identifies the user by checking his/her fingerprint, voiceprint, or the like. The personal identification information is transmitted to the vehicle-mounted terminal 12 via the short distance communication transmission and reception units 20 and 15. The vehicle-mounted terminal 18 unlocks the door by checking the personal identification information in the same manner as in the tenth embodiment, and stores the personal identification information in the storage unit 17.

When an accident happens, the personal identification information stored in the storage unit 17 is sent to the portable terminal 18, which then transmits the personal identification information to the receiving center. At the receiving center, medical data concerning people who are likely to ride in the vehicle is prestored in a database, with the medical data being information showing their blood types, chronic diseases, allergies, doctors in charge, emergency contact addresses, and the like. This information makes it possible for the receiving center to support appropriate and swift relief activities.

Accordingly, in the eleventh embodiment, the portable terminal 18 is provided with the person identifying means 30, and personal identification information is transmitted to the emergency report receiving center by the portable terminal 18 when an accident happens. Therefore, this realizes an emergency reporting apparatus for a vehicle that makes it possible to perform appropriate relief activities without delay and to enhance the effect of saving the life of a passenger.

TWELFTH EMBODIMENT

Figure 10:
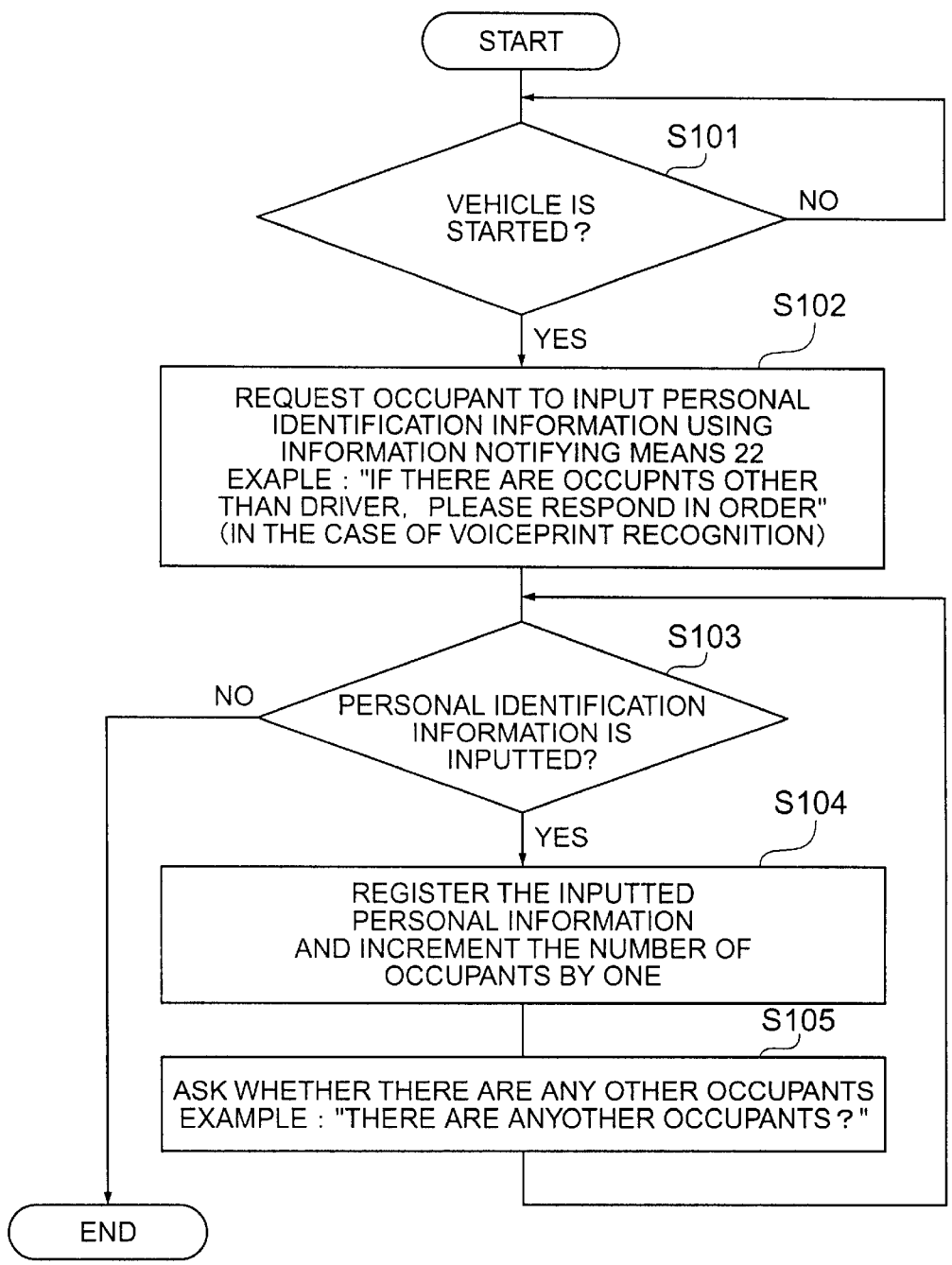
FIG. 10 is a flowchart showing the control operation according to the twelfth embodiment of the present invention.
Figure 11:
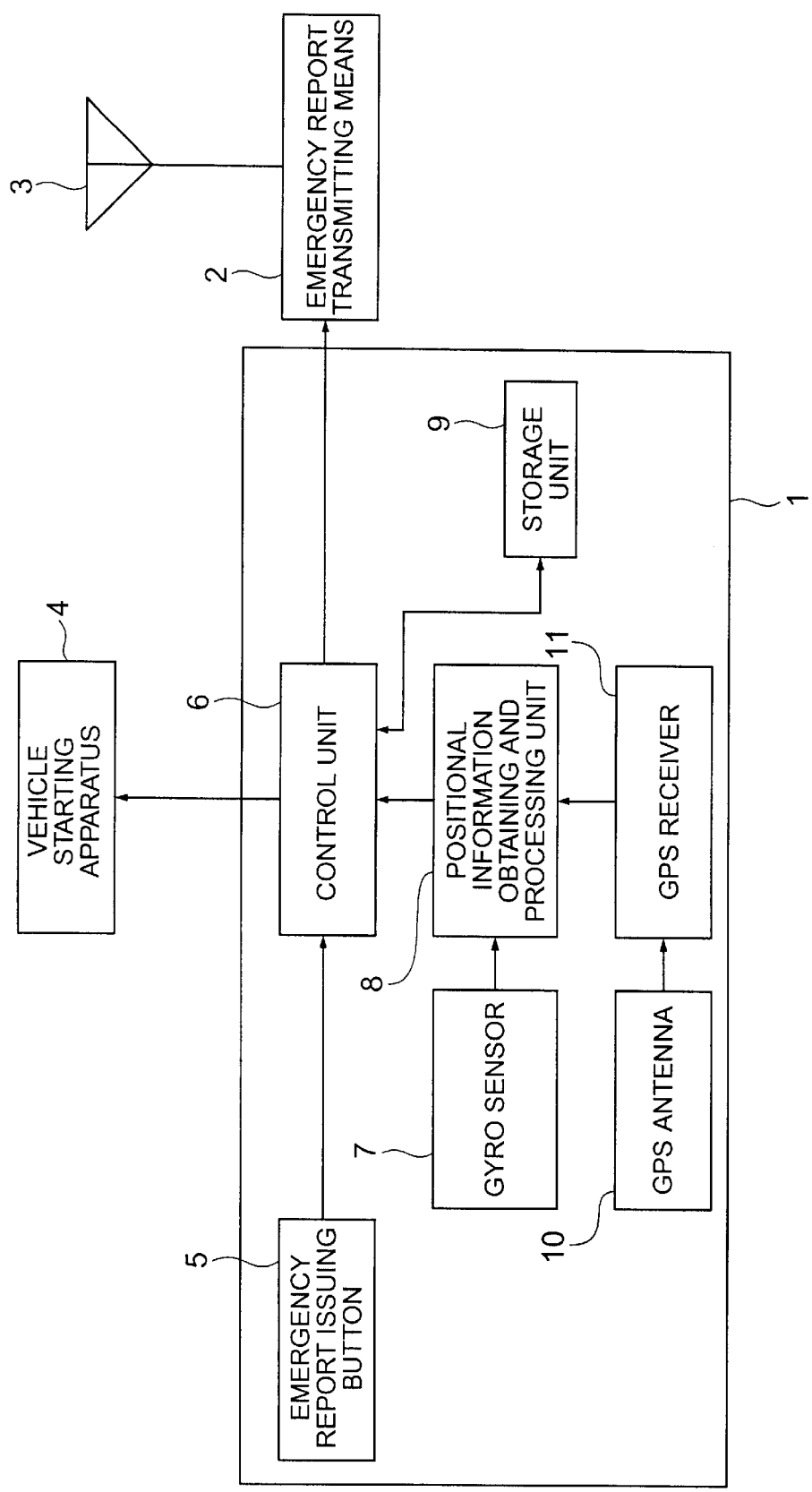
FIG. 11 is a block diagram showing a construction of a conventional emergency reporting apparatus for a vehicle.

FIG. 10 is a flowchart according to the twelfth embodiment in which personal identification information concerning occupants other than a driver is collected by the control unit 14 of the vehicle-mounted terminal 12. Note that the construction of an emergency reporting apparatus for a vehicle according to this twelfth embodiment is the same as that of the eleventh embodiment shown in FIG. 9. In this embodiment, however, the person identifying means 30 of the portable terminal is also used to input personal identification information about the occupants other than the driver, or an input apparatus for inputting such personal identification information is added to the information notifying means 22.

Next, the operation of the emergency reporting apparatus according to the twelfth embodiment is described with reference to FIGS. 9 and 10.

When detecting the start of a vehicle or the like, the vehicle-mounted terminal 12 asks whether there are occupants other than a driver in the vehicle using the information notifying means 22, and requests them to input their personal identification information (steps S101 and S102). Here, each time a piece of personal identification information is inputted, the vehicle-mounted terminal 12 updates information giving the number of occupants by incrementing the number of occupants by one, and asks whether there are any other occupants who should input personal identification information. When the input of personal information is not made any more, the number of pieces of personal identification information that have been inputted up to this time is set as the number of occupants and each piece of personal identification information is stored in the storage unit 17.

When an accident happens, the number of occupants and the identification information concerning each occupant are sent to the portable terminal 18 via the short distance communication transmission and reception units 15 and 20. The portable terminal 18 transmits the number of occupants and the identification information to an emergency report receiving center. At the emergency report receiving center, medical data concerning people who are likely to ride in the vehicle is prestored in a database, with the medical data being information showing their blood types, chronic diseases, allergies, doctors in charge, emergency contact addresses, and the like. This information makes it possible for the receiving center to support appropriate and swift relief activities.

Accordingly, in the twelfth embodiment, the vehicle-mounted terminal 12 stores personal identification information concerning occupants other than a driver that is inputted when they get into the vehicle. When an accident or the like happens, the number of occupants and the personal identification information concerning each occupant are sent to an emergency report receiving center via the portable terminal 18. Therefore, this realizes an emergency reporting apparatus for a vehicle that makes it possible to provide appropriate relief activities without delay for every occupant including the driver and to enhance the effect of saving lives of the occupants.

INDUSTRIAL APPLICABILITY

As described above, the emergency reporting apparatus for a vehicle of the present invention comprises a vehicle-mounted terminal and a portable terminal. The vehicle-mounted terminal is mounted on the vehicle, includes an accident detecting means for detecting an accident happened to the vehicle and a short distance communication means for performing short distance communication in a non-contact manner to send information concerning the accident when the accident detecting means detects the accident, and sends the accident information in the non-contact manner. The portable terminal is a mobile telephone, includes a keyless entry control means for unlocking and locking a door of the vehicle and a short distance communication means for performing short distance communication with the short distance communication means of the vehicle-mounted terminal in the non-contact manner, and transmits the accident information sent from the vehiclemounted terminal to a preset emergency report receiving center. This construction forces a driver to bring the portable terminal into the vehicle when he/she gets into the vehicle. Also, it is possible for the driver to get into the vehicle by unlocking the vehicle door using the keyless entry control means provided in the portable terminal. Further, when an accident happens to the vehicle, the accident is automatically reported to the predetermined receiving center using the short distance communication transmission and reception units and the mobile telephone function of the portable terminal possessed by the user. Further, the portable terminal necessarily exists in the vehicle when the user rides in the vehicle and when an accident happens. In addition, it is possible to transmit an emergency report without requiring the user to perform troublesome operation such as the connection and fixing of the portable terminal to a predetermined part.

What is claimed is:

1. An emergency reporting apparatus for a vehicle comprising:
   a vehicle-mounted terminal that is mounted on the vehicle, includes an accident detecting means for detecting an accident happened to the vehicle and a communicating means for sending information concerning the accident when said accident detecting means detects the accident, and sends the accident information; and
   a portable terminal that is a mobile telephone, includes a door open/close control means for unlocking or locking a door of the vehicle and a communicating means for communicating with the communicating means of said vehicle-mounted terminal, and transmits the accident information sent from said vehicle-mounted terminal to a preset transmission destination.

2. An emergency reporting apparatus for a vehicle according to claim 1, wherein the door open/close control means of said portable terminal includes a communicating means and unlocks or locks the vehicle door by operating a door unlocking/locking means mounted on the vehicle.

3. An emergency reporting apparatus for a vehicle according to claim 1, wherein the door open/close control means of said portable terminal sends a door unlocking signal or a door locking signal to the vehicle-mounted terminal via the communicating means provided in the portable terminal in order to unlock or lock the vehicle door by operating a door unlocking/locking means mounted on the vehicle via the vehicle-mounted terminal.

4. An emergency reporting apparatus for a vehicle according to claim 1, wherein said portable terminal includes a position detecting means and transmits the accident information, to which positional information has been added by said transmitting means, to the preset transmission destination.

5. An emergency reporting apparatus for a vehicle according to claim 1, wherein when detecting a shortage of remaining charge in a battery, said portable terminal informs the vehicle-mounted terminal of the shortage of the remaining charge in the battery using said communicating means, and said vehicle-mounted terminal notifies a user of the shortage of the remaining charge in the battery using an information notifying means mounted on the vehicle.

6. An emergency reporting apparatus for a vehicle according to claim 1, wherein said vehicle-mounted terminal communicates with said portable terminal using said communicating means at predetermined time intervals and, when the communication becomes impossible, notifies a user that it becomes impossible to transmit an emergency report, the notification being made using an information notifying means mounted on the vehicle.

7. An emergency reporting apparatus for a vehicle according to claim 1, wherein said portable terminal includes a door unlocking button for unlocking the vehicle door and a door locking button for locking the vehicle door.

8. An emergency reporting apparatus for a vehicle according to claim 1, wherein said portable terminal includes a door unlocking/locking button for unlocking and locking the vehicle door.

9. An emergency reporting apparatus for a vehicle according to claim 8, wherein said vehicle-mounted terminal stores personal identification information that concerns each occupant other than a driver and is inputted when the occupant gets into the vehicle and, when an accident happens, transmits a number of people riding in the vehicle and the personal identification information concerning each occupant to the transmission destination via said portable terminal.

10. An emergency reporting apparatus for a vehicle according to claim 1, wherein said portable terminal includes a door unlocking and conversation starting off hook button for unlocking the vehicle door and starting a telephone conversation and a door locking and conversation ending on hook button for locking the vehicle door and ending the telephone conversation.

11. An emergency reporting apparatus for a vehicle according to claim 1, wherein said portable terminal includes an information notifying means, said vehicle-mounted terminal informs said portable terminal whether the door is in an unlocked state or a locked state using said communicating means, and said portable terminal notifies a user of whether the door is in an unlocked state or a locked state using said information notifying means.

12. An emergency reporting apparatus for a vehicle according to claim 1, wherein said vehicle-mounted terminal prestores identification information identifying a person and controls one of unlocking and locking of the door, ignition of an engine, and start of the vehicle by comparing the identification information with information sent from said portable terminal via the communicating means.

13. An emergency reporting apparatus for a vehicle according to claim 1, wherein said portable terminal includes a person identifying means for identifying a person and, when an accident happens, transmits identification information concerning the person to the transmission destination.

* * * * *